(12) United States Patent
Teflioudi et al.

(10) Patent No.: US 12,461,915 B1
(45) Date of Patent: Nov. 4, 2025

(54) REDUCING ACTIVITY OF THE MAIN SQL EXECUTOR THREAD

(71) Applicant: SAP SE, Walldorf (DE)

(72) Inventors: Christina Teflioudi, Heidelberg (DE); Paul Willems, Heidelberg (DE); Marius Eich, Neustadt (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/817,079

(22) Filed: Aug. 27, 2024

(51) Int. Cl.
  *G06F 15/16* (2006.01)
  *G06F 16/2453* (2019.01)
  *G06F 16/2458* (2019.01)

(52) U.S. Cl.
  CPC .. *G06F 16/24545* (2019.01); *G06F 16/24532* (2019.01); *G06F 16/2471* (2019.01)

(58) Field of Classification Search
  None
  See application file for complete search history.

(56) References Cited

U.S. PATENT DOCUMENTS

| | | | | |
|---|---|---|---|---|
| 2019/0384843 | A1* | 12/2019 | White | G06F 16/9024 |
| 2020/0293532 | A1* | 9/2020 | Uzar | G06F 16/24542 |
| 2020/0348968 | A1* | 11/2020 | Huchachar | G06F 9/445 |
| 2023/0376486 | A1* | 11/2023 | Trigonakis | G06F 9/5066 |

* cited by examiner

*Primary Examiner* — Alex Gofman
(74) *Attorney, Agent, or Firm* — Mintz Levin Cohn Ferris Glovsky and Popeo, P.C.

(57) ABSTRACT

A database execution engine generates a first query execution plan in response to receiving a first query, where a thread limit is specified for worker threads launched by the database execution engine. A first main executor thread is launched to process the first query and a first plurality of tasks are created to be performed in response to the first query. Then, a first plurality of worker threads are launched to perform the first plurality of tasks, where the first plurality of worker threads is less than or equal to the thread limit. In response to parallelizing processing of the first query execution plan, the first main executor thread is restricted to a first period of execution time before entering a waiting phase. The first main executor thread is woken up after the first plurality of worker threads have completed the first plurality of tasks.

20 Claims, 8 Drawing Sheets

REDUCING ACTIVITY OF THE MAIN SQL EXECUTOR THREAD

TECHNICAL FIELD

The present disclosure generally relates to database management and, more specifically, to query execution on database tables.

BACKGROUND

Database management systems have become an integral part of many computer systems. For example, some systems handle hundreds if not thousands of transactions per second. On the other hand, some systems perform very complex multidimensional analysis on data. In both cases, the underlying database may need to handle responses to queries very quickly in order to satisfy systems requirements with respect to transaction time. A database query is a mechanism for retrieving data from one or more database tables. Queries may be generated in accordance with a corresponding query language. For example, structured query language (SQL) is a declarative querying language that is used to retrieve data from a relational database. Given the complexity of queries and/or the volume of queries, the underlying databases face challenges when attempting to optimize performance.

SUMMARY

In some implementations, a database execution engine generates a first query execution plan in response to receiving a first query, where a thread limit is specified for the total number of worker threads that are allowed to be launched by the database execution engine. A first main executor thread is launched to process the first query. Also, a first plurality of tasks are created to be performed in response to the first query. Then, a first plurality of worker threads are launched to perform the first plurality of tasks, where the first plurality of worker threads is less than or equal to the thread limit. In response to parallelizing processing of the first query execution plan, the first main executor thread is restricted to a first period of execution time before the first main executor thread is forced to enter a waiting phase. The first main executor thread is woken up from the waiting phase after the first plurality of worker threads have finished performing the first plurality of tasks. Then, the first main executor thread closes the first query in response to execution of the first query execution plan being complete.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
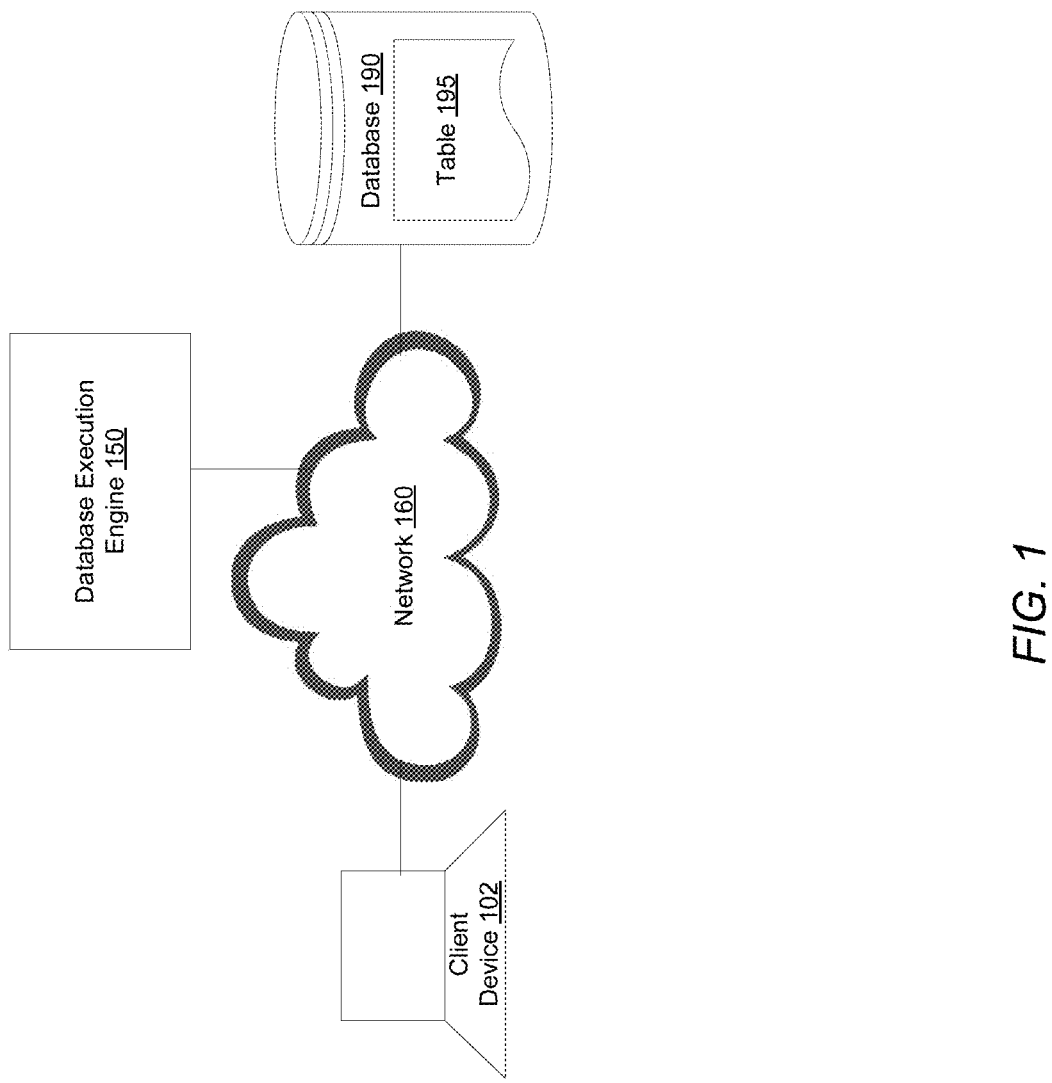
FIG. 1 illustrates a diagram of an example of a database system, in accordance with some example implementations of the current subject matter.

FIG. 1 depicts a system diagram illustrating an example of a database system 100, in accordance with some example embodiments. Referring to FIG. 1, the database system 100 may include one or more client devices 102, a database execution engine 150, and one or more databases 190. As shown in FIG. 1, the one or more client devices 102, the database execution engine 150, and the one or more databases 190 may be communicatively coupled via a network 160. The one or more databases 190 may include a variety of relational databases including, for example, an in-memory database, a column-based database, a row-based database, and/or the like. The database execution engine 150 may store a database table 195 at the one or more databases 190, with the database table 195 representative of any number and type of tables.

In some example embodiments, the one or more databases 190 may include a relational database. However, it should be appreciated that the one or more databases 190 may include any type of database including, for example, an in-memory database, a hierarchical database, an object database, an object-relational database, and/or the like. For example, instead of and/or in addition to including a relational database, the one or more databases 190 may include a graph database, a column store, a key-value store, a document store, and/or the like.

The one or more client devices 102 may include processor-based devices including, for example, a mobile device, a wearable apparatus, a personal computer, a workstation, an Internet-of-Things (IoT) appliance, and/or the like. The network 160 may be a wired network and/or wireless network including, for example, a public land mobile network (PLMN), a local area network (LAN), a virtual local area network (VLAN), a wide area network (WAN), the Internet, and/or the like.

To illustrate by way of an example, a given client device 102 may send a query via the database execution engine 150 to the database layer including the one or more databases 190, which may represent a persistence and/or storage layer where database tables may be stored and/or queried. Furthermore, the database execution engine 150 may provide the ability to access table storage via an abstract interface to a table adapter, which may reduce dependencies on specific types of storage and persistence layers, which may in turn enable use with different types of storage and persistence layers.

The database execution engine 150 may be configured to handle different types of databases and the corresponding persistent layers and/or tables therein. For example, the one or more databases 190 may include at least one row-oriented database, in which case an insert is performed by adding a row with a corresponding row identifier. Alternatively and/or additionally, the one or more databases 190 may include one or more column store databases, which may use dictionaries and compression techniques when inserting data into a table. Where the database layer includes multiple different types of databases, the database execution engine 150 may perform execution related to handling the differences between different types of databases such as row-oriented databases and column store databases. This may enable a reduction in processing at the database layer, for example, at each of the one or more databases 190. Moreover, the database execution engine 150 may perform other operations including rule-based operations, such as joins and projections, as well as filtering, group by, multidimensional analysis, and/or the like to reduce the processing burden on the database layer. In this way, the database execution engine 150 may execute these and other complex operations, while the one or more databases 190 can perform simpler operations to reduce the processing burden at the one or more databases 190.

Figure 2:
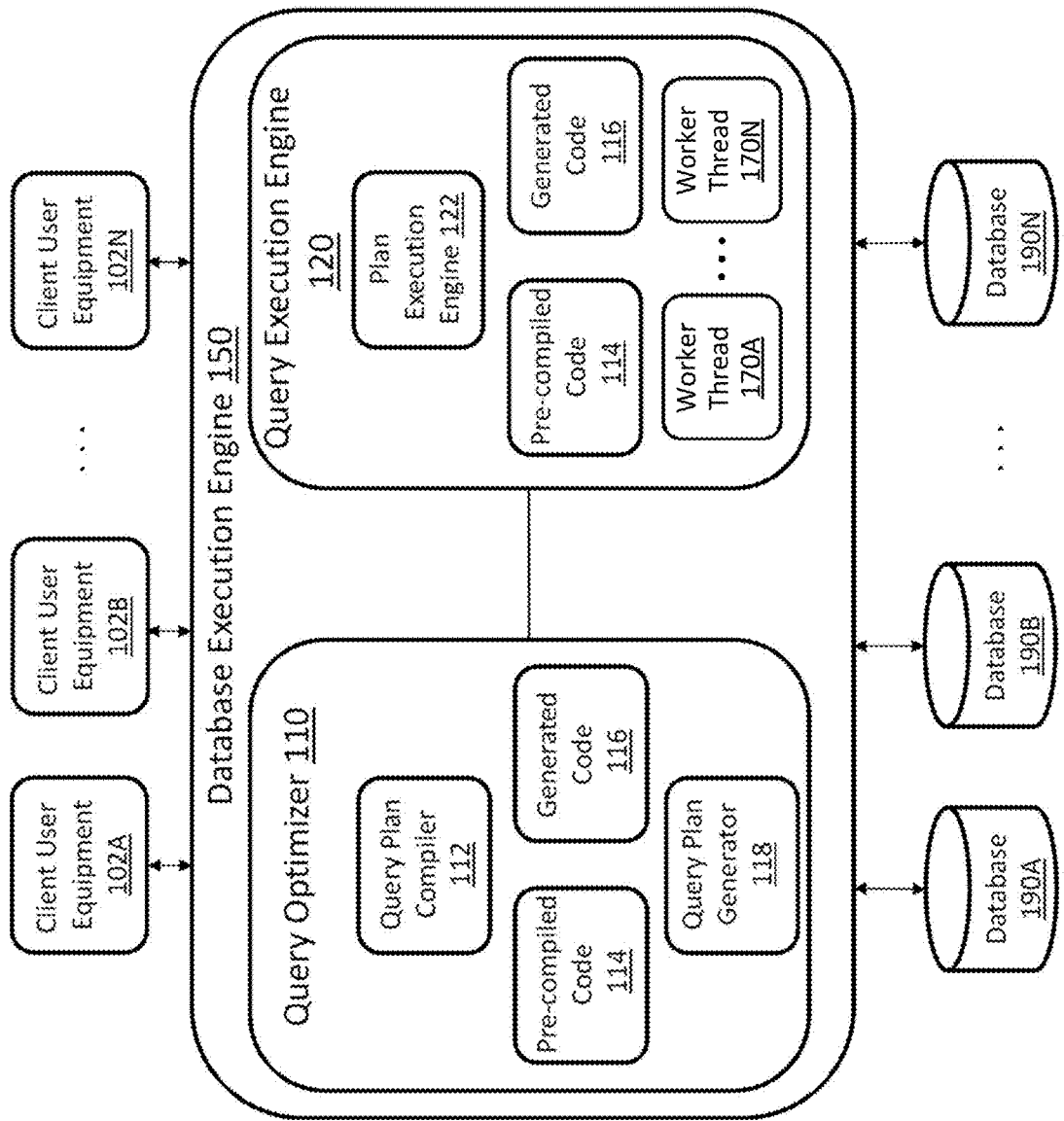
FIG. 2 illustrates a block diagram of a database execution engine, in accordance with some example implementations of the current subject matter.

FIG. 2 depicts a block diagram illustrating an example of the database execution engine 150, in accordance with some example embodiments. As shown in FIG. 2, the one or more databases 190 may include a first database 190A, a second database 190B, a third database 190N, and so on. The one or more databases 190 can represent the database layer of a database management system (DBMS) where data may be persisted and/or stored in a structured way, and where the data may be queried or operated on using operations such as SQL commands or other types of commands/instructions to provide reads, writes, and/or perform other operations. To illustrate by way of an example, one or more client devices, which may include the client user equipment 102A-N, may send queries via the database execution engine 150 to the database layer including the one or more databases 190, which may represent a persistence and/or storage layer where database tables may be stored and/or queried. The queries may be sent via a connection, such as a wired connection and/or wireless connection (e.g., the Internet, cellular links, WiFi links, and/or the like) provided, for example, by the network 160.

In an example, the database execution engine 150 may include a query optimizer 110, such as a SQL optimizer and/or another type of optimizer, to receive at least one query from the one or more client devices 102 and generate a corresponding query plan (which may be optimized) for execution by a query execution engine 120. The query optimizer 110 may receive a request, such as a query, and then form or propose an optimized query plan. The query plan (which may be optimized) may be represented as a so-called "query algebra" or "relational algebra." The query plan may propose an optimum query plan with respect to, for example, the execution time of the overall query. To optimize a query, the query plan optimizer 110 may obtain one or more costs for the different ways the execution of the query plan may be performed, and the costs may be in terms of execution time at, for example, the one or more databases 190.

A query plan compiler 112 may enable compilation of at least a portion of the query plan. The query plan compiler 112 may compile the optimized query algebra into operations, such as program code and/or any other type of command, operation, object, or instruction. This code may include pre-compiled code 114 (which may be pre-compiled and stored and then selected for certain operations in the query plan) and/or generated code 116 generated specifically for execution of the query plan. For example, the query plan compiler 112 may select pre-compiled code 114 for a given operation as part of the optimization of the query plan, while for another operation in the query plan the query plan compiler 112 may allow a compiler to generate the code (i.e., generated code 116). The pre-compiled code 114 and the generated code 116 represent code for executing the query plan, and this code may be provided to a query plan generator 118, which interfaces with the query execution engine 120.

In some example embodiments, the query optimizer 110 may optimize the query plan by compiling and generating code. Moreover, the query optimizer 110 may optimize the query plan to enable pipelining during execution. The query execution engine 120 may receive, from the query plan generator 118, compiled code to enable execution of the optimized query plan, although the query execution engine 120 may also receive code or other commands directly from a higher-level application or another source such as the one or more client devices 102. The pre-compiled code 114 and/or the generated code 116 may be provided to a plan execution engine 122 of the query execution engine 120. The plan execution engine 122 may then prepare the plan for execution, and this query plan may include the pre-compiled code 114 and/or the generated code 116. When the code for the query plan is ready for execution during runtime, the query execution engine 120 may step through the code, performing some of the operations within the database execution engine 150 and sending some of the operations (or commands in support of an operation, such as a read, write, and/or the like) for execution at one or more of one or more database 190.

In some example embodiments, the query execution engine 120 may run, as noted above, the generated code 116 generated for some query operations, while the pre-compiled code 114 may be run for other operations. Moreover, the query execution engine 120 may combine the generated code 116 with the pre-compiled code 114 to further optimize execution of query related operations. In addition, the query execution engine 120 may provide for a plan execution framework that is able to handle data chunk(s), pipelining, and state management during query execution. Furthermore, the query execution engine 120 may provide the ability to access table storage via an abstract interface to a table adapter, which may reduce dependencies on specific types of storage/persistence layers (which may enable use with different types of storage/persistence layers).

To execute a query accessing a dataset, the query execution engine 120 may divide the query into a quantity of tasks. One or more of the worker threads 170 (e.g., a first worker thread 170A, a second worker thread 170N) may be allocated to perform the tasks associated with the query. The quantity of the worker threads 170 the query execution engine 120 allocates may be determined based on the progress of the query observed at various time intervals. For example, upon allocating an initial quantity of the worker threads 170 to perform the tasks associated with the query, the query execution engine 120 may monitor the progress of the query (e.g., the quantity of tasks that have not been performed by any the worker threads 170, the quantity of tasks that have been performed relative to the total quantity of outstanding tasks, and/or the like) to determine whether to increase that initial quantity of the worker threads 170.

Figure 3:
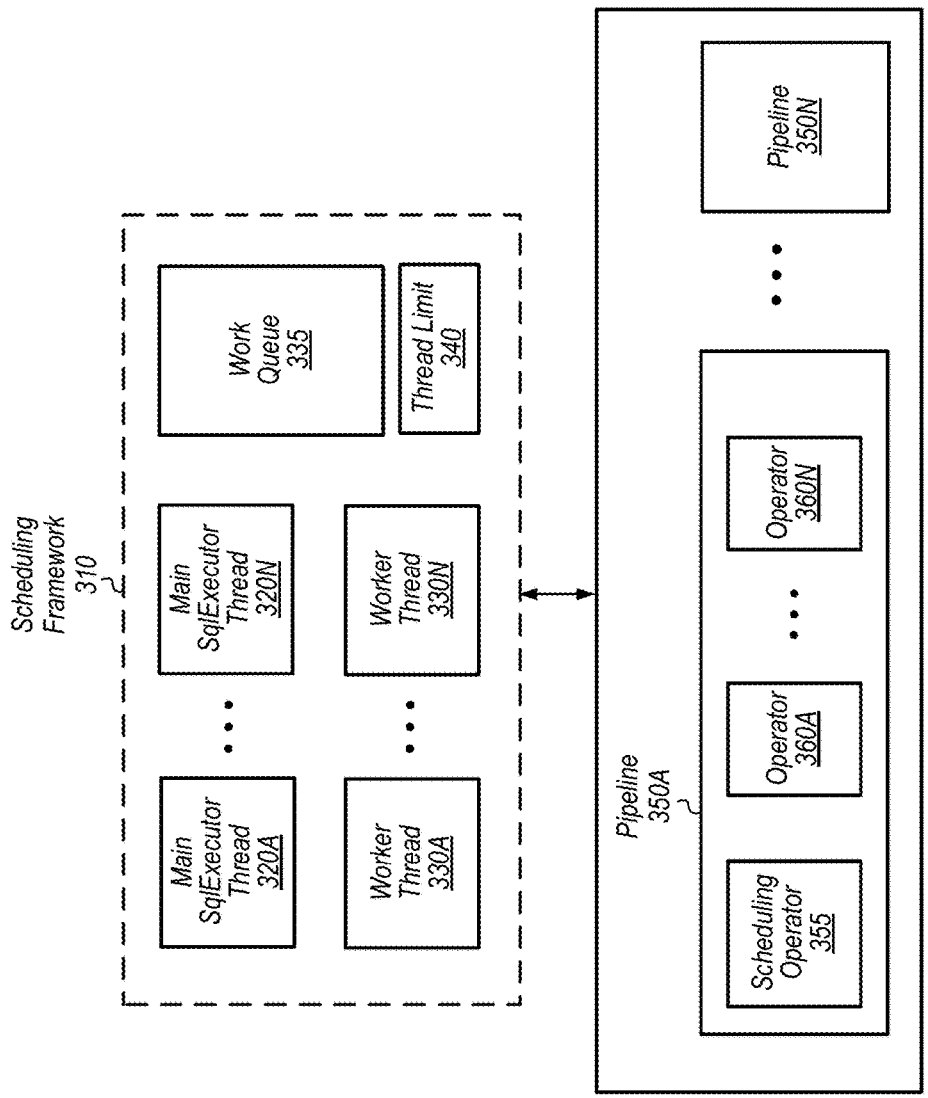
FIG. 3 illustrates a block diagram of a query execution environment, in accordance with some example implementations of the current subject matter.

Referring now to FIG. 3, a block diagram of a query execution environment 300 is depicted, in accordance with one or more embodiments of the current subject matter. In an example, query execution environment 300 includes at least scheduling framework 310 and pipelines 350A-N. Scheduling framework 310 may be implemented using any suitable combination of hardware (e.g., circuitry, one or more processing units) and/or software (e.g., program instructions). Scheduling framework 310 may include at least main SqlExecutor threads 320A-N, worker threads 330A-N, and work queue 335. In an example, scheduling framework 310 includes various settings, with thread limit 340 being one of these settings. Thread limit 340 specifies a total number of threads that are allowed to execute concurrently within a single query or a set of queries. Once this thread limit 340 is reached, scheduling framework 310 is prevented from using further worker threads.

Scheduling framework 310 may create main SqlExecutor threads 320A-N which are representative of any number of main SqlExecutor threads. When a query is received by query execution environment 300, scheduling framework 310 may create a new main SqlExecutor thread 320A to process the received query. Scheduling framework 310 may also create worker threads 335A-N which are representative of any number of worker threads. Worker threads 335A-N execute the operators (e.g., operators 360A-N) of the pipelines 350A-N on parts of data that form tasks. In an example, the work contained in the pipelines 350A-N is partitioned into tasks and the worker threads 335A-N repeatedly pick tasks and process them. It is noted that query execution environment 300 may also include other components which are not shown to avoid obscuring the figure.

When a query is received by a database execution engine (e.g., database execution engine 150 of FIG. 1), a query execution plan may be generated for the query. The query execution plan may include a plurality of query execution pipelines such as pipelines 350A-N, which are representative of any number and type of query execution pipelines. Each query execution pipeline in the plurality of query execution pipelines may be configured to execute a plurality of operations in a predetermined order associated with each query execution pipeline. Each pipeline 350A-N may include any number of operators, with scheduling operator 355 and operators 360A-N shown within pipeline 350A. It is noted that a query execution pipeline may be referred to as a pipeline, for short.

At each scheduling point, main SqlExecutor threads 320A-N schedule tasks which are added to work queue 335. Work queue 335 is representative of any number of work queues. Worker threads 330A-N are created to work on the tasks in work queue 335. Before a main SqlExecutor thread 320A destroys any states and moves to the next pipeline 350A-N, the main SqlExecutor thread 320A needs to wait for the tasks it scheduled to finish. Before entering the waiting phase, the main SqlExecutor thread 320A also steals work (i.e., performs tasks) from work queue 335.

Clients of a database system often use thread limits to control the thread usage for a single query or for a group of queries. In one embodiment, the thread limit only applies to worker threads and is not enforced on main SqlExecutor threads so that the database system appears always able to receive a new query. Since in an example design, the main SqlExecutor threads 320A-N can execute tasks and consume considerable processing resources, a total thread limit 340 of N can be violated by executing N+1 queries in parallel, where N is a positive integer. In order to mitigate this scenario, the duration during which a main SqlExecutor thread 320A-N can execute tasks may be restricted. Once this duration is exceeded, the main SqlExecutor thread 320A-N waits until all of the tasks it has scheduled are finished. In some embodiments, a main SqlExecutor thread 320A-N may execute without restrictions for cases which assume that the main SqlExecutor thread 320A-N is executing. For example, a result streaming scenario is designed around the assumption that the main SqlExecutor thread 320A-N executes tasks and checks between tasks if it should pause execution. Similarly for a distributed query processing scenario, a main SqlExecutor thread 320A-N may execute without restrictions. In general, the main SqlExecutor thread 320A-N may execute without restrictions when on a projection pipeline or in a distributed query processing scenario. On other pipelines, the duration during which a main SqlExecutor thread 320A-N can execute tasks may be restricted to prevent thread limit 340 from being exceeded for a long period of time.

Figure 4:
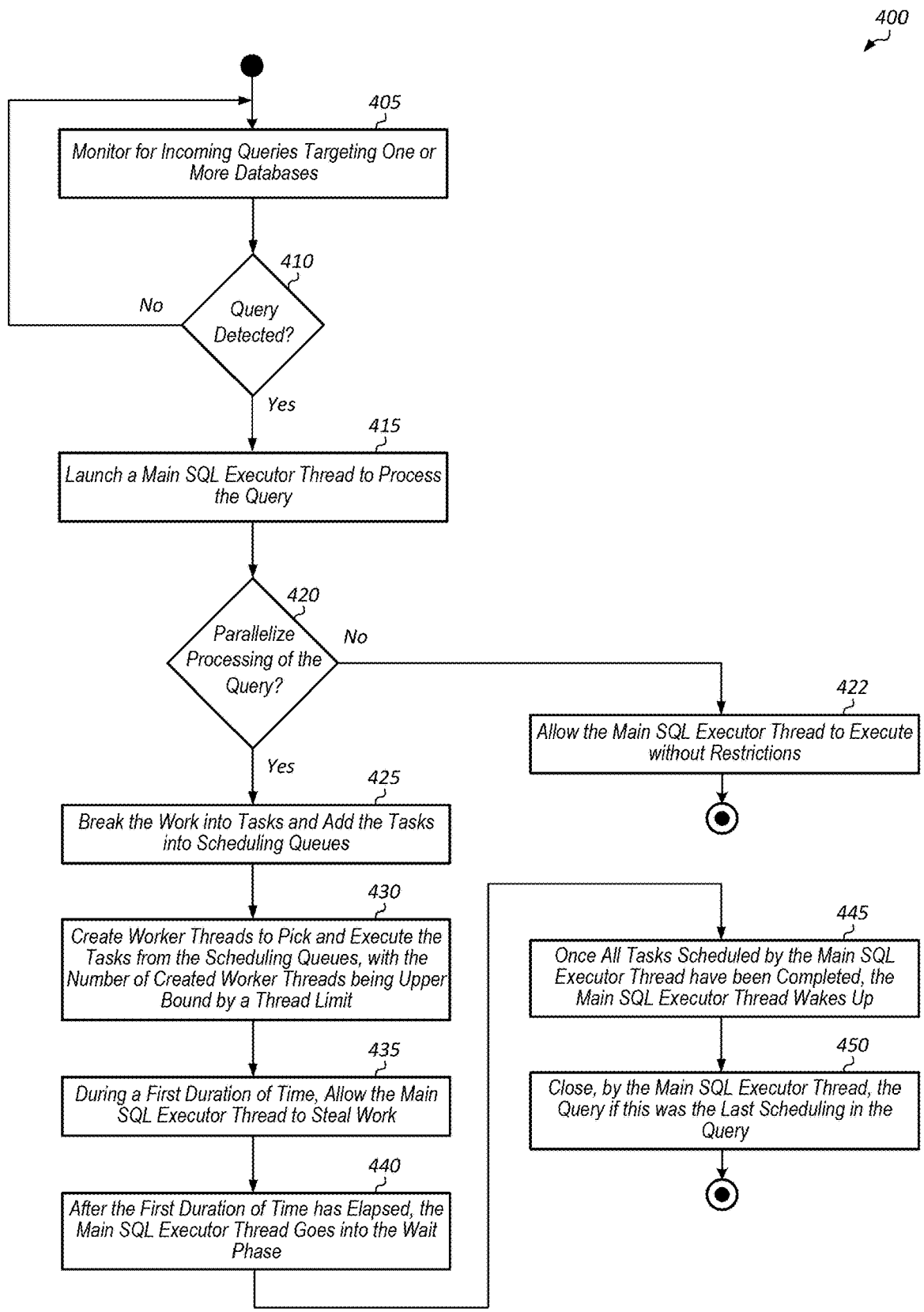
FIG. 4 illustrates a process for reducing main SQL executor thread activity, in accordance with some example implementations of the current subject matter.

Turning now to FIG. 4, a process for reducing main SQL executor thread activity is depicted, in accordance with one or more embodiments of the current subject matter. At the beginning of method 400, a database execution engine monitors for incoming queries targeting one or more databases (block 405). Next, if a query is detected (conditional block 410, "yes" leg), then the database execution engine launches a main SQL executor thread to process the query (block 415). Processing the query may include generating a query execution plan for the query and then executing the query execution plan.

If a decision is made to parallelize the processing of the query (conditional block 420, "yes" leg), then the main SQL executor thread breaks the work into tasks and adds the tasks into scheduling queues (block 425). The scheduling framework creates worker threads to pick and execute the tasks from the scheduling queues, with the number of created worker threads being upper bound by a thread limit (block 430). Getting worker threads running takes some time, so during a first duration of time, the main SQL executor thread is allowed to steal work from the scheduling queues (block 435). The length of the first duration of time may vary from embodiment to embodiment. After the first duration of time has elapsed, the main SQL executor thread goes into the wait phase (block 440). Once all tasks scheduled by the main SQL executor thread have been completed, the main SQL executor thread wakes up (block 445). Then, the main SQL executor thread closes the query if this was the last scheduling in the query (block 450). Otherwise, if this is not the last scheduling in the query, the main SQL executor thread executes the next part of the pipeline until the next scheduling operator. After block 450, method 400 may end. If the processing of the query is not parallelized (conditional block 420, "no" leg), then the main SQL executor thread is allowed to execute without restrictions (block 422). After block 422, method 400 may end. In another embodiment, conditional block 420 may check to see if the main SQL executor thread is on a pipeline that does result streaming or if the plan is distributed. In this other embodiment, if the pipeline does result streaming or if the plan is distributed, the main SQL executor thread is allowed to execute without restrictions.

Figure 5:
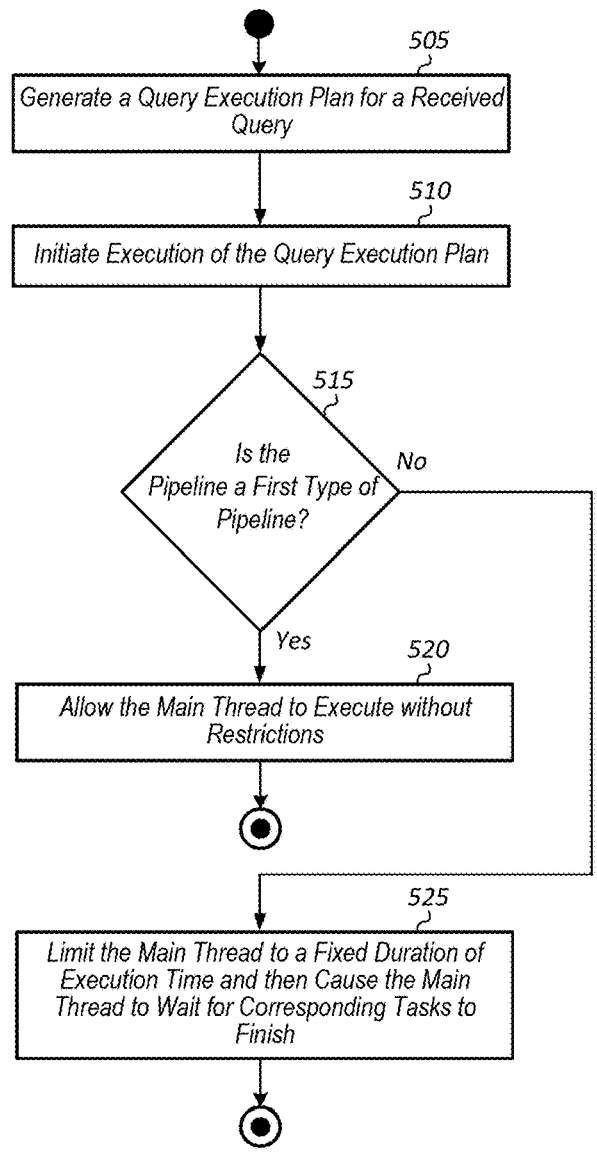
FIG. 5 illustrates a process for determining whether to enforce time restrictions on a main thread based on a type of pipeline, in accordance with some example implementations of the current subject matter.

Referring now to FIG. 5, a process for determining whether to enforce time restrictions on a main thread based on a type of pipeline is depicted, in accordance with one or more embodiments of the current subject matter. A database execution engine (e.g., database execution engine 150 of FIG. 1) generates a query execution plan for a received query (block 505). Next, the database execution engine initiates execution of the query execution plan (block 510). For each pipeline of the query execution plan, the database execution engine may determine if the pipeline is a first type of pipeline (e.g., projection pipeline, distributed query processing (DQP) pipeline) (conditional block 515). If the pipeline is a first type of pipeline (conditional block 515, "yes" leg), then the database execution engine allows the main thread to execute without restrictions (block 520). Otherwise, if the pipeline is a second type of pipeline (conditional block 515, "no" leg), then the database execution engine limits the main thread to a fixed duration of execution time and then causes the main thread to wait for corresponding tasks to finish (block 525). After blocks 520 and 525, method 500 may end. In an example, the second type of pipeline may include all pipelines that are not projection pipelines or DQP pipelines. In other words, if a given pipeline is neither a projection pipelines nor a DQP pipeline, then the given pipeline is the second type of pipeline.

Figure 6:
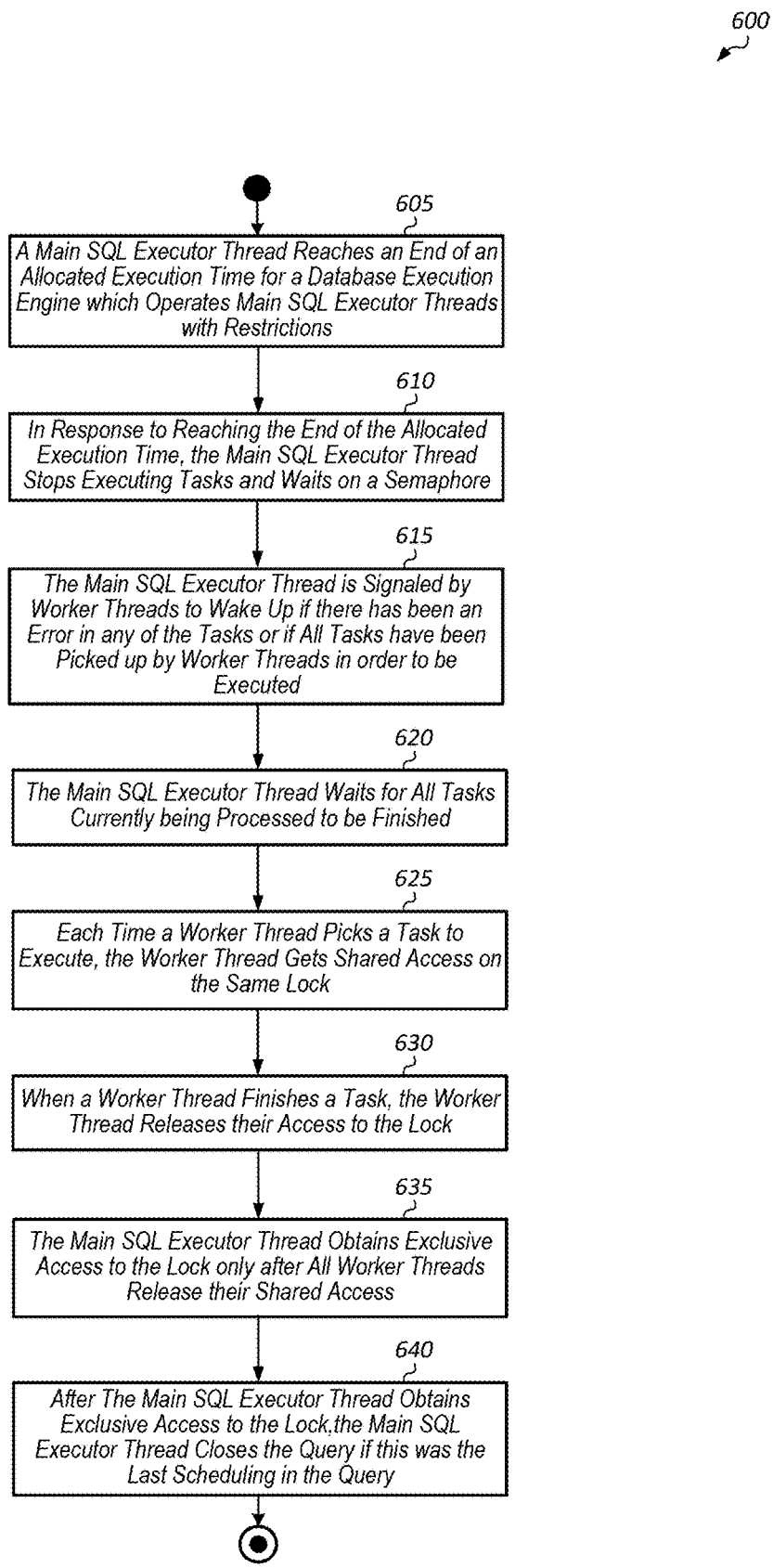
FIG. 6 illustrates a process for employing a shared lock, in accordance with some example implementations of the current subject matter.

Turning now to FIG. 6, a process for employing a shared lock is depicted, in accordance with one or more embodiments of the current subject matter. At the beginning of method 600, a main SQL executor thread reaches an end of an allocated execution time for a database execution engine which operates main SQL executor threads with restrictions (block 605). In response to reaching the end of the allocated execution time, the main SQL executor thread stops executing tasks and waits on a semaphore (block 610). The main SQL executor thread is signaled by worker threads to wake up if there has been an error in any of the tasks or if all tasks have been picked up by worker threads in order to be executed (block 615). The main SQL executor thread then waits for all tasks currently processed to be finished (block 620). Each time a worker thread picks a task to execute, it gets shared access on the same lock (block 625). When a worker thread finishes a task, the worker thread releases their access to the lock (block 630). The main SQL executor thread obtains exclusive access to the lock only after all worker threads release their shared access (block 635). Then, after the main SQL executor thread obtains exclusive access to the lock, the main SQL executor thread closes the query if this was the last scheduling in the query (block 640). Otherwise, if this is not the last scheduling in the query, the main SQL executor thread executes the next part of the pipeline until the next scheduling operator. After block 640, method 600 ends.

Figure 7A:
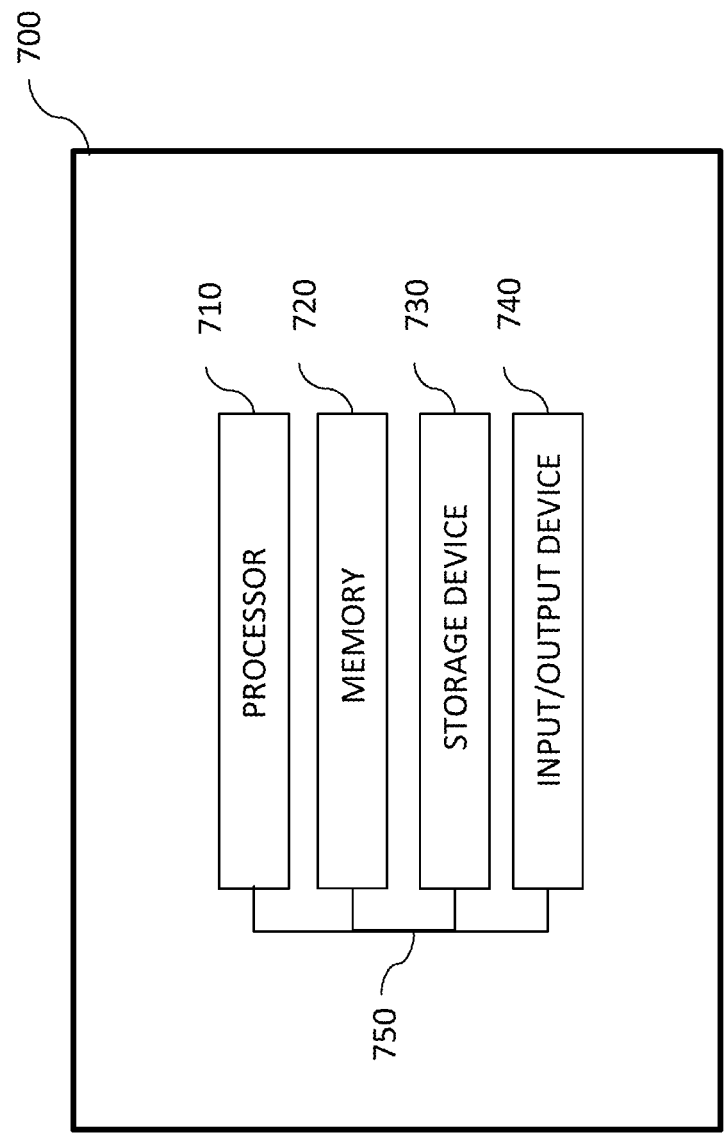
FIG. 7A depicts an example of a system, in accordance with some example implementations of the current subject matter.

In some implementations, the current subject matter may be configured to be implemented in a system 700, as shown in FIG. 7A. The system 700 may include a processor 710, a memory 720, a storage device 730, and an input/output device 740. Each of the components 710, 720, 730 and 740 may be interconnected using a system bus 750. The processor 710 may be configured to process instructions for execution within the system 700. In some implementations, the processor 710 may be a single-threaded processor. In alternate implementations, the processor 710 may be a multi-threaded processor. The processor 710 may be further configured to process instructions stored in the memory 720 or on the storage device 730, including receiving or sending information through the input/output device 740. The memory 720 may store information within the system 700. In some implementations, the memory 720 may be a computer-readable medium. In alternate implementations, the memory 720 may be a volatile memory unit. In yet some implementations, the memory 720 may be a non-volatile memory unit. The storage device 730 may be capable of providing mass storage for the system 700. In some implementations, the storage device 730 may be a computer-readable medium. In alternate implementations, the storage device 730 may be a floppy disk device, a hard disk device, an optical disk device, a tape device, non-volatile solid state memory, or any other type of storage device. The input/output device 740 may be configured to provide input/output operations for the system 700. In some implementations, the input/output device 740 may include a keyboard and/or pointing device. In alternate implementations, the input/output device 740 may include a display unit for displaying graphical user interfaces.

Figure 7B:
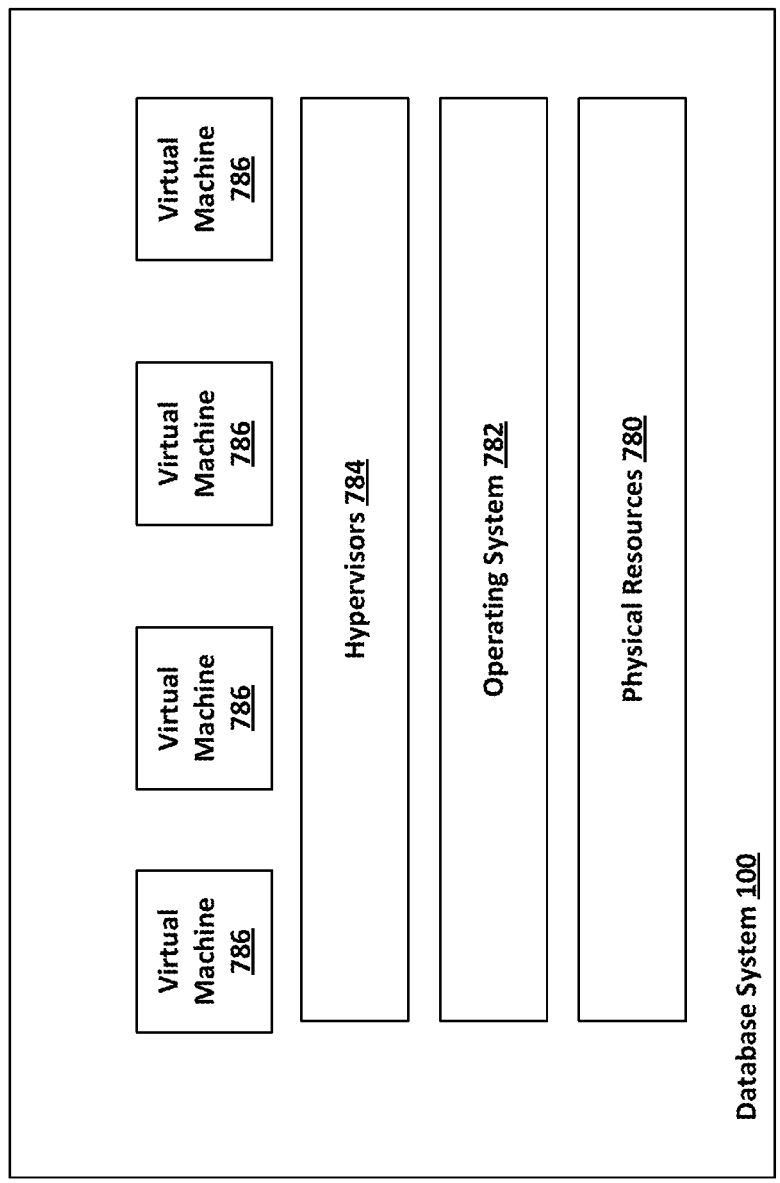
FIG. 7B depicts another example of a system, in accordance with some example implementations of the current subject matter.

FIG. 7B depicts an example implementation of the database system 100 (of FIG. 1). The database system 100 may be implemented using various physical resources 780, such as at least one or more hardware servers, at least one storage, at least one memory, at least one network interface, and the like. The database system 100 may also be implemented using infrastructure, as noted above, which may include at least one operating system 782 for the physical resources 780 and at least one hypervisor 784 (which may create and run at least one virtual machine 786). For example, each multitenant application may be run on a corresponding virtual machine 786.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second and the like can, in some situations, relate to an order; as used in a document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include program instructions (i.e., machine instructions) for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives program instructions as a machine-readable signal. The term "machine-readable signal" refers to any signal used to provide machine instructions and/or data to a programmable processor. The machine-readable medium can store such program instructions non-transitorily, such as for example as would a non-transient solid state memory or a magnetic hard drive or any equivalent storage medium. The machine-readable medium can alternatively or additionally store such machine instructions in a transient manner, such as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A computer-implemented method comprising: generating, by a database execution engine, a first query execution plan in response to receiving a first query, wherein a thread limit is specified for worker threads launched by the database execution engine; launching a first main executor thread to process the first query; creating a first plurality of tasks to be performed in response to the first query; launching a first plurality of worker threads to perform the first plurality of tasks, wherein the first plurality of worker threads is less than or equal to the thread limit; in response to parallelizing processing of the first query execution plan, restricting the first main executor thread to a first period of execution time before the first main executor thread is forced to enter a waiting phase; waking up the first main executor thread after the first plurality of worker threads have finished performing the first plurality of tasks; and closing, by the first main executor thread, the first query in response to execution of the first query execution plan being completed.

Example 2: The computer-implemented method of Example 1, wherein the first query execution plan comprises at least a first query execution pipeline.

Example 3: The computer-implemented method of any of Examples 1-2, further comprising restricting the first main executor thread to the first period of execution time responsive to the first query execution pipeline being a first type of pipeline.

Example 4: The computer-implemented method of any of Examples 1-3, wherein the first type of pipeline is a projection pipeline.

Example 5: The computer-implemented method of any of Examples 1-4, wherein the first type of pipeline is a distributed query processing pipeline.

Example 6: The computer-implemented method of any of Examples 1-5, further comprising: generating, by the database execution engine, a second query execution plan in response to receiving a second query; launching a second main executor thread to process the second query; and allowing the second main executor thread to execute without time restrictions responsive to determining the second query execution plan includes a second pipeline which is a second type of pipeline different from the first type of pipeline.

Example 7: The computer-implemented method of any of Examples 1-6, further comprising: generating, by the database execution engine, a second query execution plan in response to receiving a second query; launching a second main executor thread to process the second query; creating a second plurality of tasks to be performed as part of the second query execution plan; and launching a second plurality of worker threads to perform the second plurality of tasks, wherein a sum of the first plurality of worker threads and the second plurality of worker threads is less than or equal to the thread limit.

Example 8: The computer-implemented method of any of Examples 1-7, wherein the second plurality of worker threads are launched concurrently with the first plurality of worker threads.

Example 9: The computer-implemented method of any of Examples 1-8, wherein the second plurality of worker threads are launched in response to parallelizing processing of the second query execution plan.

Example 10: The computer-implemented method of any of Examples 1-9, further comprising allowing the first main executor thread to perform one or more tasks of the first plurality of tasks during the first period of execution.

Example 11: A system comprising: at least one processor; and at least one memory storing instructions that, when executed by the at least one processor, cause operations comprising: generating a first query execution plan in response to receiving a first query; launching a first main executor thread to process the first query; creating a first plurality of tasks to be performed in response to the first query; launching a first plurality of worker threads to perform the first plurality of tasks, wherein the first plurality of worker threads is less than or equal to a thread limit; in response to parallelizing processing of the first query execution plan, restricting the first main executor thread to a first period of execution time before the first main executor thread is forced to enter a waiting phase; waking up the first main executor thread after the first plurality of worker threads have finished performing the first plurality of tasks; and closing, by the first main executor thread, the first query in response to completing execution of the first query execution plan.

Example 12: The system of Example 11, wherein the first query execution plan comprises at least a first query execution pipeline.

Example 13: The system of any of Examples 11-12, wherein the operations further comprise restricting the first main executor thread to the first period of execution time responsive to the first query execution pipeline being a first type of pipeline.

Example 14: The system of any of Examples 11-13, wherein the first type of pipeline is a projection pipeline.

Example 15: The system of any of Examples 11-14, wherein the first type of pipeline is a distributed query processing pipeline.

Example 16: The system of any of Examples 11-15, wherein the operations further comprise: generating, by the database execution engine, a second query execution plan in response to receiving a second query; launching a second main executor thread to process the second query; and allowing the second main executor thread to execute without time restrictions responsive to determining the second query execution plan includes a second pipeline which is a second type of pipeline different from the first type of pipeline.

Example 17: The system of any of Examples 11-16, wherein the operations further comprise: generating, by the database execution engine, a second query execution plan in response to receiving a second query; launching a second main executor thread to process the second query; creating a second plurality of tasks to be performed as part of the second query execution plan; and launching a second plurality of worker threads to perform the second plurality of tasks, wherein a sum of the first plurality of worker threads and the second plurality of worker threads is less than or equal to the thread limit.

Example 18: The system of any of Examples 11-17, wherein the second plurality of worker threads are launched concurrently with the first plurality of worker threads.

Example 19: The system of any of Examples 11-18, wherein the second plurality of worker threads are launched in response to parallelizing processing of the second query execution plan.

Example 20: A non-transitory computer readable medium storing instructions, which when executed by at least one data processor, result in operations comprising: generating a first query execution plan in response to receiving a first query; launching a first main executor thread to process the first query; creating a first plurality of tasks to be performed in response to the first query; launching a first plurality of worker threads to perform the first plurality of tasks, wherein the first plurality of worker threads is less than or equal to a thread limit; in response to parallelizing processing of the first query execution plan, restricting the first main executor thread to a first period of execution time before the first main executor thread is forced to enter a waiting phase; waking up the first main executor thread after the first plurality of worker threads have finished performing the first plurality of tasks; and closing, by the first main executor thread, the first query in response to completing execution of the first query execution plan.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method comprising:
   generating, by a database execution engine, a first query execution plan in response to receiving a first query, wherein a thread limit is specified for worker threads launched by the database execution engine;
launching a first main executor thread to process the first query;
creating a first plurality of tasks to be performed in response to the first query;
launching a first plurality of worker threads to perform the first plurality of tasks, wherein the first plurality of worker threads is less than or equal to the thread limit;
in response to parallelizing processing of the first query execution plan, restricting the first main executor thread to a first period of execution time before the first main executor thread is forced to enter a waiting phase;
waking up the first main executor thread after the first plurality of worker threads have finished performing the first plurality of tasks; and
closing, by the first main executor thread, the first query in response to execution of the first query execution plan being completed.

2. The computer-implemented method of claim 1, wherein the first query execution plan comprises at least a first query execution pipeline.

3. The computer-implemented method of claim 2, further comprising restricting the first main executor thread to the first period of execution time responsive to the first query execution pipeline being a first type of pipeline.

4. The computer-implemented method of claim 3, wherein the first type of pipeline is a projection pipeline.

5. The computer-implemented method of claim 3, wherein the first type of pipeline is a distributed query processing pipeline.

6. The computer-implemented method of claim 3, further comprising:
generating, by the database execution engine, a second query execution plan in response to receiving a second query;
launching a second main executor thread to process the second query; and
allowing the second main executor thread to execute without time restrictions responsive to determining the second query execution plan includes a second pipeline which is a second type of pipeline different from the first type of pipeline.

7. The computer-implemented method of claim 1, further comprising:
generating, by the database execution engine, a second query execution plan in response to receiving a second query;
launching a second main executor thread to process the second query;
creating a second plurality of tasks to be performed as part of the second query execution plan; and
launching a second plurality of worker threads to perform the second plurality of tasks, wherein a sum of the first plurality of worker threads and the second plurality of worker threads is less than or equal to the thread limit.

8. The computer-implemented method of claim 7, wherein the second plurality of worker threads are launched concurrently with the first plurality of worker threads.

9. The computer-implemented method of claim 7, wherein the second plurality of worker threads are launched in response to parallelizing processing of the second query execution plan.

10. The computer-implemented method of claim 1, further comprising allowing the first main executor thread to perform one or more tasks of the first plurality of tasks during the first period of execution.

11. A system comprising:
at least one processor; and
at least one memory storing instructions that, when executed by the at least one processor, cause operations comprising:
generating a first query execution plan in response to receiving a first query;
launching a first main executor thread to process the first query;
creating a first plurality of tasks to be performed in response to the first query;
launching a first plurality of worker threads to perform the first plurality of tasks, wherein the first plurality of worker threads is less than or equal to a thread limit;
in response to parallelizing processing of the first query execution plan, restricting the first main executor thread to a first period of execution time before the first main executor thread is forced to enter a waiting phase;
waking up the first main executor thread after the first plurality of worker threads have finished performing the first plurality of tasks; and
closing, by the first main executor thread, the first query in response to completing execution of the first query execution plan.

12. The system of claim 11, wherein the first query execution plan comprises at least a first query execution pipeline.

13. The system of claim 12, wherein the operations further comprise restricting the first main executor thread to the first period of execution time responsive to the first query execution pipeline being a first type of pipeline.

14. The system of claim 13, wherein the first type of pipeline is a projection pipeline.

15. The system of claim 13, wherein the first type of pipeline is a distributed query processing pipeline.

16. The system of claim 13, wherein the operations further comprise:
generating, by the database execution engine, a second query execution plan in response to receiving a second query;
launching a second main executor thread to process the second query; and
allowing the second main executor thread to execute without time restrictions responsive to determining the second query execution plan includes a second pipeline which is a second type of pipeline different from the first type of pipeline.

17. The system of claim 11, wherein the operations further comprise:
generating, by the database execution engine, a second query execution plan in response to receiving a second query;
launching a second main executor thread to process the second query;
creating a second plurality of tasks to be performed as part of the second query execution plan; and
launching a second plurality of worker threads to perform the second plurality of tasks, wherein a sum of the first plurality of worker threads and the second plurality of worker threads is less than or equal to the thread limit.

18. The system of claim 17, wherein the second plurality of worker threads are launched concurrently with the first plurality of worker threads.

19. The system of claim 17, wherein the second plurality of worker threads are launched in response to parallelizing processing of the second query execution plan.

20. A non-transitory computer readable medium storing instructions, which when executed by at least one data processor, result in operations comprising:
- generating a first query execution plan in response to receiving a first query;
- launching a first main executor thread to process the first query;
- creating a first plurality of tasks to be performed in response to the first query;
- launching a first plurality of worker threads to perform the first plurality of tasks, wherein the first plurality of worker threads is less than or equal to a thread limit;
- in response to parallelizing processing of the first query execution plan, restricting the first main executor thread to a first period of execution time before the first main executor thread is forced to enter a waiting phase;
- waking up the first main executor thread after the first plurality of worker threads have finished performing the first plurality of tasks; and
- closing, by the first main executor thread, the first query in response to completing execution of the first query execution plan.

* * * * *